(12) United States Patent
Huang

(10) Patent No.: US 10,972,318 B2
(45) Date of Patent: Apr. 6, 2021

(54) DATA STREAM PROCESSING DEVICE WITH RECONFIGURABLE DATA STREAM PROCESSING RESOURCES AND DATA STREAM PROCESSING METHOD

(71) Applicant: Hughes Network Systems LLC, Germantown, MD (US)

(72) Inventor: Tony Huang, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 154 days.

(21) Appl. No.: 16/176,609

(22) Filed: Oct. 31, 2018

(65) Prior Publication Data

US 2020/0136865 A1 Apr. 30, 2020

(51) Int. Cl.
*G06F 11/00* (2006.01)
*H04L 25/03* (2006.01)
*G06F 11/07* (2006.01)

(52) U.S. Cl.
CPC .... *H04L 25/03012* (2013.01); *G06F 11/0709* (2013.01); *G06F 11/0751* (2013.01); *H04L 2025/03414* (2013.01); *H04L 2025/03471* (2013.01)

(58) Field of Classification Search
CPC ........... H03H 17/0294; H03H 17/0202; H04B 17/309; H04B 17/382; H04B 1/001
See application file for complete search history.

(56) References Cited

U.S. PATENT DOCUMENTS

| | | | | |
|---|---|---|---|---|
| 4,733,403 A | * | 3/1988 | Simone | H03D 3/007 375/350 |
| 6,473,474 B1 | * | 10/2002 | Wiegand | H04B 1/0003 375/285 |
| 7,756,197 B1 | * | 7/2010 | Ferguson | H04L 25/03038 375/224 |
| 7,793,013 B1 | * | 9/2010 | Esposito | H03H 17/0223 708/271 |
| 8,116,820 B2 | * | 2/2012 | Lee | H04B 7/0632 455/562.1 |
| 8,200,181 B1 | * | 6/2012 | Khlat | H04B 1/30 455/313 |
| 9,954,698 B1 | | 4/2018 | Huang et al. | |
| 10,613,205 B2 | * | 4/2020 | Mortensen | G01S 7/52017 |
| 2002/0161806 A1 | * | 10/2002 | Shaikh | H03H 17/06 708/300 |

(Continued)

*Primary Examiner* — Loan L. T. Truong
(74) *Attorney, Agent, or Firm* — Global IP Counselors, LLP

(57) ABSTRACT

A data stream processing device includes a plurality of data providing units, a plurality of processing units, and control circuitry. The data providing units are configured to output data values received via a plurality of data inputs, respectively. The processing units are configured to generate data outputs based on the data values, respectively. The control circuitry includes a mode selection input and is configured to simultaneously provide data values of different data streams to the data inputs of the data providing units, respectively, in response to the mode selection input receiving a signal indicating a first mode, and simultaneously provide a plurality of successive groups of data values of one of the data streams to the data inputs of the data providing units, respectively, in response to the mode selection input not receiving the signal indicating the first mode.

19 Claims, 7 Drawing Sheets

(56) References Cited

U.S. PATENT DOCUMENTS

| | | | |
|---|---|---|---|
| 2003/0021340 A1* | 1/2003 | McElroy | H03H 17/0225 375/229 |
| 2003/0072363 A1* | 4/2003 | McDonald | H04N 5/211 375/232 |
| 2003/0083583 A1* | 5/2003 | Kovtun | A61B 5/0428 600/509 |
| 2005/0105507 A1* | 5/2005 | Clements | H03K 17/163 370/351 |
| 2006/0176947 A1* | 8/2006 | Lim | H04L 1/0054 375/232 |
| 2007/0053380 A1* | 3/2007 | Graham | H04J 3/16 370/466 |
| 2008/0013638 A1* | 1/2008 | Walton | H04L 1/0026 375/260 |
| 2008/0165907 A1* | 7/2008 | Sobchak | H03H 17/0685 375/355 |
| 2008/0285640 A1* | 11/2008 | McCallister | H04L 25/03343 375/233 |
| 2014/0045541 A1* | 2/2014 | Moshfeghi | H04B 7/024 455/500 |
| 2014/0126323 A1* | 5/2014 | Li | G01S 15/8981 367/7 |
| 2016/0065311 A1* | 3/2016 | Winzer | H04B 10/588 398/193 |
| 2018/0013540 A1* | 1/2018 | Giaconi | H04L 49/30 |
| 2018/0262371 A1* | 9/2018 | Li | H04L 25/03025 |
| 2019/0140706 A1* | 5/2019 | Chang | H04B 7/0413 |
| 2019/0348970 A1* | 11/2019 | Skinner | H03H 17/0202 |
| 2020/0136865 A1* | 4/2020 | Huang | G06F 11/0751 |

* cited by examiner

DATA STREAM PROCESSING DEVICE WITH RECONFIGURABLE DATA STREAM PROCESSING RESOURCES AND DATA STREAM PROCESSING METHOD

BACKGROUND

Field of the Invention

The present invention generally relates to a data stream processing device. More specifically, the present invention relates to a data stream processing device configured to process data streams. Also, the present invention generally relates to a data stream processing method.

Background Information

Modern digital communication devices perform real time data stream processing. Such real time data stream processing can require substantial hardware resources, such as multipliers, adders, and other arithmetic units. It can be useful for a single device to be flexibly applied to perform different processing of data streams. Often such flexibility can be achieved by simply adding additional resources. However, generally such approach increases the cost of the device.

On the other hand, modern digital communication devices can include parallel, reconfigurable receivers or transmitters and have the ability to process multiple data streams simultaneously. Such reconfigurable devices are known in the field of data stream processing (see U.S. Pat. No. 9,954,698, for example). With such devices, multiple data streams can be filtered using parallel processing engines.

SUMMARY

Even though a device is designed to filter many parallel data streams, certain operating conditions such as bandwidth allocation or network configuration can limit this parallel processing to just one or two data streams in actual operation, which underutilizes the full hardware potential of the device.

One object is to provide a data stream processing device with which resources for processing data stream can be efficiently utilized.

In view of the state of the known technology, a data stream processing device is provided that includes a plurality of data providing units, a plurality of processing units, and control circuitry. The data providing units are configured to output data values received via a plurality of data inputs, respectively. The processing units are configured to generate data outputs based on the data values, respectively. The control circuitry includes a mode selection input and is configured to simultaneously provide data values of different data streams to the data inputs of the data providing units, respectively, in response to the mode selection input receiving a signal indicating a first mode, and simultaneously provide a plurality of successive groups of data values of one of the data streams to the data inputs of the data providing units, respectively, in response to the mode selection input not receiving the signal indicating the first mode.

Also, other features, aspects and advantages of the disclosed data stream processing device will become apparent to those skilled in the field of the data stream processing device from the following detailed description, which, taken in conjunction with the annexed drawings, discloses several illustrative embodiments of a data stream processing device with various features.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The present application is related to a device and a method to efficiently utilize and combine signal processing resources in reconfigurable, parallel arrays of FIR Filters and linear channel equalizers. Specifically, the present application illustrates a device and a method to flexibly reconfigure and combine the signal processing resources of an array of independent, parallel FIR filters into a smaller array of independent FIR filters with longer tap length. Also, the present application illustrates a device and a method to further optimize the design of the filters when the filter coefficients exhibit symmetries of an odd or even function. Here, the impulse response of an FIR filter is also its coefficient set. Furthermore, the present application illustrates that the ideas embodied in this application readily extends to the design of adaptive linear channel equalizers, and enables an array of independent equalizers to reconfigure and combine both their filtering components and their coefficient adaptation components to form a smaller array of independent equalizers with longer tap lengths and superior frequency-selective properties.

First Embodiment

Figure 1:
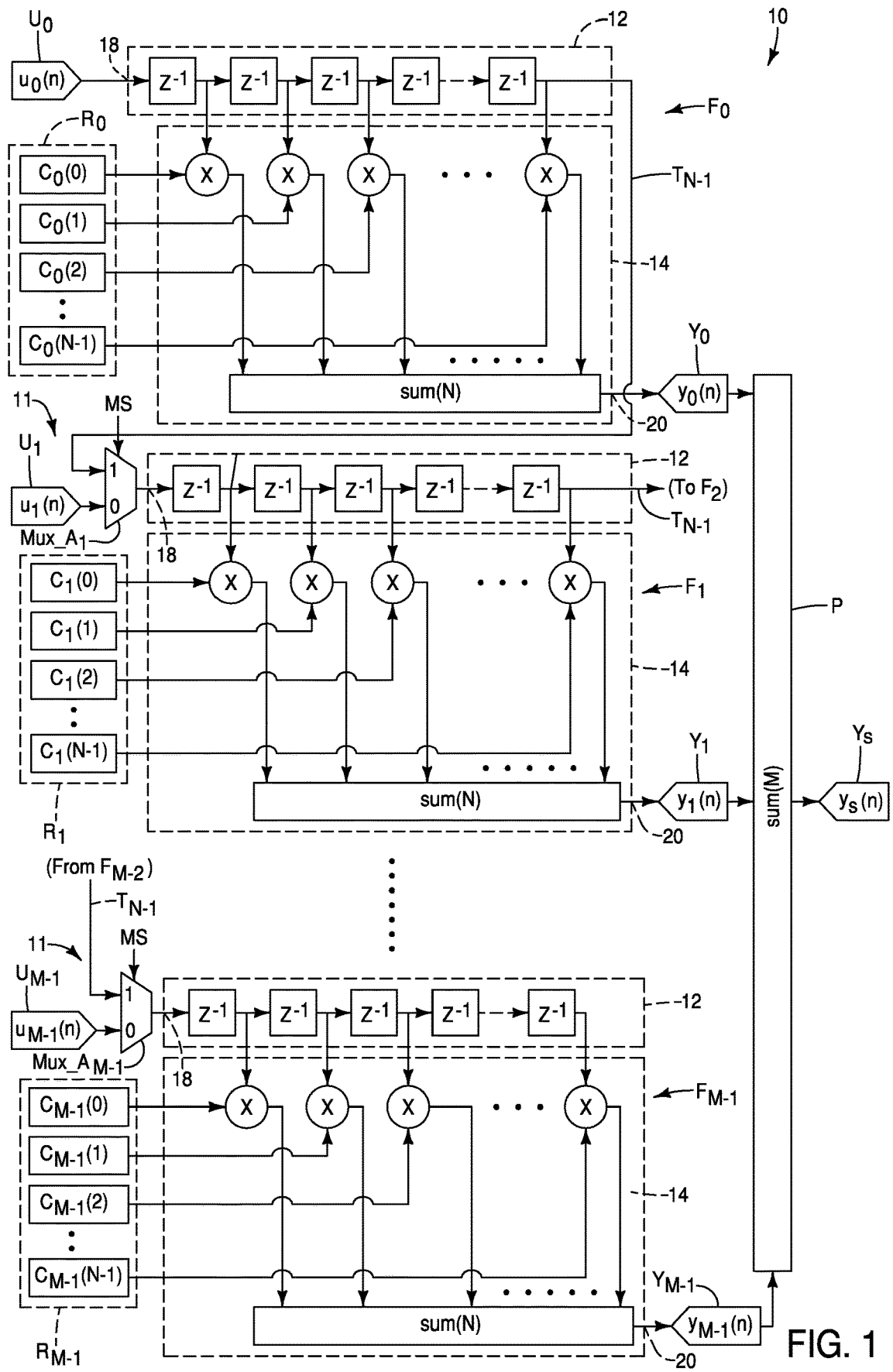
FIG. 1 illustrates a block diagram of a data stream processing device with an array of M filters each having an N-tap FIR filter according to a first embodiment.

FIG. 1 illustrates an example of a data stream processing device 10 according to an exemplary embodiment. As shown in FIG. 1, the data stream processing device 10 includes a plurality of (M: M is two or more) digital filters F ($F_0$, $F_1$, ..., $F_{M-1}$). Specifically, in the illustrated embodiment, the filters F ($F_0$, $F_1$, ..., $F_{M-1}$) each have an N-tap digital filter (N is one or more), such as a finite impulse response (FIR) filter, for example. The data stream processing device 10 also includes control circuitry 11 that has one or more (M−1 in the illustrated embodiment) multiplexers Mux_A (Mux_$A_1$, . . . , Mux_$A_{M-1}$). The multiplexers Mux_A (Mux_$A_1$, . . . , Mux_$A_{M-1}$) are coupled between adjacent pairs of the filters F ($F_0$, $F_1$, . . . , $F_{M-1}$), respectively. In the illustrated embodiment, the number M of digital filters F can be set to any number that is two or more, as needed and/desired. Also, the number N of the taps of the digital filters F can be set to any number that is one or more, as needed and/desired.

In the illustrated embodiment, by operation of the multiplexers Mux_A (Mux_$A_1$, . . . , Mux_$A_{M-1}$), the operation mode of the data stream processing device 10 is switched between a "first mode" in which the filters F ($F_0$, $F_1$, . . . , $F_{M-1}$) independently perform filtering operations on a plurality of (M) independent input data streams U ($U_0$, $U_1$, . . . , $U_{M-1}$) and a "second mode" in which the filters F ($F_0$, $F_1$, . . . , $F_{M-1}$) perform a filtering operation on the input data stream $U_0$ as a single filter.

Furthermore, in the illustrated embodiment, the data stream processing device 10 also includes a plurality of (M) coefficient registers R ($R_0$, $R_1$, . . . , $R_{M-1}$) for the filters F ($F_0$, $F_1$, . . . , $F_{M-1}$), respectively, and a summation circuit (e.g., summation unit) P. In the illustrated embodiment, the coefficient registers R ($R_0$, $R_1$, . . . , $R_{M-1}$) each store one or more (N) coefficient values C(0), C(1), . . . , C(N−1) (see FIG. 2). More specifically, as illustrated in FIG. 1, the coefficient register $R_0$ stores coefficient values $C_0$(0), $C_0$(1), . . . , $C_0$(N−1), the coefficient register $R_1$ stores coefficient values $C_1$(0), $C_1$(1), . . . , $C_1$(N−1), . . . , and the coefficient register $R_{M-1}$ stores coefficient values $C_{M-1}$(0), $C_{M-1}$(1), . . . , $C_{M-1}$(N−1). In the illustrated embodiment, the coefficient registers R ($R_0$, $R_1$, . . . , $R_{M-1}$) are formed as separate registers (or register devices). However, the coefficient registers R ($R_0$, $R_1$, . . . , $R_{M-1}$) each can be formed as part of single register (or a single register device).

Figure 2:
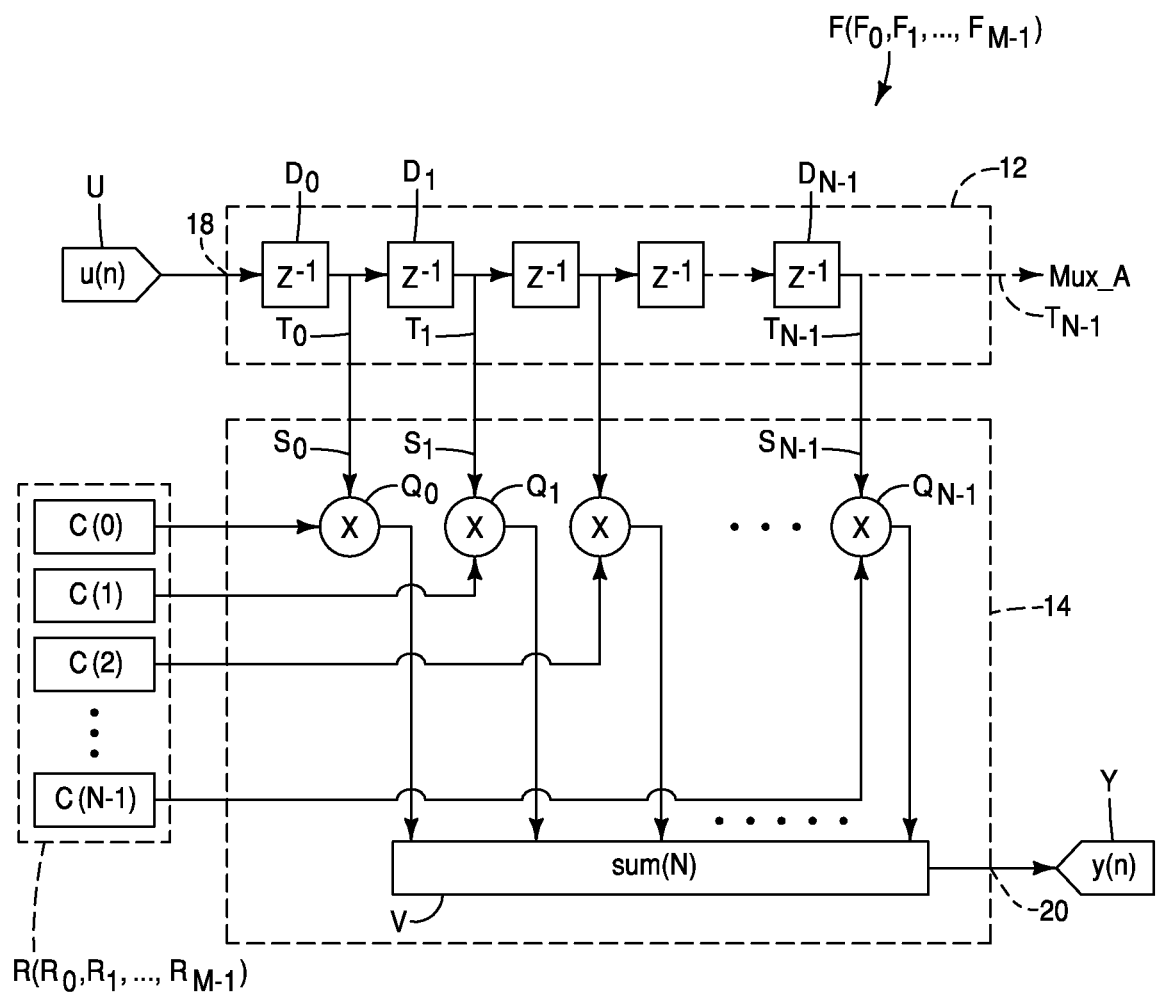
FIG. 2 illustrates an example of the N-tap FIR filter illustrated in FIG. 1.

In the illustrated embodiment, as illustrated in FIG. 2, the filters F ($F_0$, $F_1$, . . . , $F_{M-1}$) each have a digital delay line 12 (e.g., a data providing unit, a data providing circuit or a tapped delay line) and a processing unit or circuit 14. For simplicity of the explanation, FIG. 2 illustrates a simplified configuration of the filters F ($F_0$, $F_1$, . . . , $F_{M-1}$) without showing the multiplexers Mux_A. In particular, FIG. 2 illustrates a simplified configuration of the filters F ($F_0$, $F_1$, . . . , $F_{M-1}$) while the operation mode of the data stream processing device 10 is set to the "first mode." In this case, as illustrated in FIG. 2, the filters F ($F_0$, $F_1$, . . . , $F_{M-1}$) each receive an input data stream U ($U_0$, $U_1$, . . . , $U_{M-1}$) having input data or sample u(n) ($u_0$(n), $u_1$(n), . . . , $u_{M-1}$(n)) at sample period (time) n via a data input 18 of the digital delay line 12, and generate an output data stream Y ($Y_0$, $Y_1$, . . . , $Y_{M-1}$) having output data or sample y(n) ($y_0$(n), $y_1$(n), . . . , $y_{M-1}$(n)) at sample period n from a data output 20 of the processing unit 14. In the illustrated embodiment, the filters F can be formed by a single processor or multiple processors. Specifically, the digital delay line 12 and the processing unit 14 can be formed by a single processor or multiple processors.

As illustrated in FIG. 2, the digital delay line 12 includes one or more (N: N is one or more) successive delays $D_0$, $D_1$, . . . , $D_{N-1}$ that are connected in series with respect to each other. The successive delays $D_0$, $D_1$, . . . , $D_{N-1}$ are coupled to transfer input data received via the data input 18 through the successive delays $D_0$, $D_1$, . . . , $D_{N-1}$ in response to a shift signal or clock. Specifically, the delays $D_0$, $D_1$, . . . , $D_{N-1}$ can be implemented using, for example, registers, clocked registers, flip flops, or shift registers. Each delay, or a data output of each delay, can be referred to as a "tap" or "stage," for example. Thus, the digital delay line 12 illustrated in FIG. 2 can be referred to as an N-stage or N-tap digital delay line or a tapped delay line with N taps.

Furthermore, the digital delay line 12 also includes one or more (N) delayed data outputs $T_0$, $T_1$, . . . , $T_{N-1}$ that output delayed output data (e.g., data values received via the data input 18) of the delays $D_0$, $D_1$, . . . , $D_{N-1}$. Specifically, in the illustrated embodiment, the first delay $D_0$ has an input that is coupled to the data input 18 and an output that is coupled to an input of the next delay $D_1$ and also coupled to the delayed data output $T_0$. Also, the last or N-th delay $D_{N-1}$ has an input that is coupled to an output of the prior or (N−1)-th delay $D_{N-2}$ and an output that is coupled to the delayed data output $T_{N-1}$. Furthermore, except for the output of the last delay $D_{N-1}$ of the last filter $F_{M-1}$ (see FIG. 1), the delayed data output $T_{N-1}$ of the last delay $D_{N-1}$ is also coupled to an input of a respective one of the multiplexers Mux_A (Mux_$A_1$, . . . , Mux_$A_{M-1}$). Furthermore, the middle delays $D_1$, . . . , $D_{N-2}$ each have an input that is coupled to an output of a respective one of the prior delays $D_0$, . . . , $D_{N-3}$, respectively, and an output that is coupled to an input of the next delays $D_2$, . . . , $D_{N-1}$ and also coupled to a respective one of the delayed data outputs $T_1$, . . . , $T_{N-2}$.

The processing unit 14 perform a function responsive to the delayed output data received from the digital delay line 12 to generate the output data stream Y ($Y_0$, $Y_1$, . . . , $Y_{M-1}$) from the data output 20. The function can also be referred to as a "process", a "processing", or a "procedure." Performing the function can include performing a set of one or more operations, in sequence and/or combination, on the delayed output data received from the digital delay line 12. Such operations can include, but are not limited to, bitwise logical operations (such as, but not limited to, NOT, AND, OR, XOR, left shift, and right shift) and arithmetic operations (such as, but not limited to, addition, subtraction, multiplication, division, logarithmic, exponential, trigonometric, statistic, and comparison operations). In some implementations, the processing unit 14 can include a programmable processor that executes one or more program instructions to perform the function or a portion of the function. With this configuration, the processing unit 14 implements a finite impulse response (FIR) filter.

More specifically, the processing unit 14 includes one or more (N) delayed data inputs $S_0$, $S_1$, . . . , $S_{N-1}$ connected to the delayed data outputs $T_0$, $T_1$, . . . , $T_{N-1}$, respectively. Furthermore, the processing unit 14 further includes one or more (N) multiplier circuits $Q_0$, $Q_1$, . . . , $Q_{N-1}$ and a summation circuit V. The multiplier circuits $Q_0$, $Q_1$, . . . , $Q_{N-1}$ calculate the products between the data values of the delayed output data received via the delayed data inputs $S_0$, $S_1$, . . . , $S_{N-1}$ and the coefficient values C(0), C(1), . . . , C(N−1) stored in the corresponding one of the coefficient registers R ($R_0$, $R_1$, . . . , $R_{M-1}$), respectively. Then, the summation circuit V calculates the sum (sum(N)) of the products to generate the output data stream Y ($Y_0$, $Y_1$, . . . , $Y_{M-1}$) from the data output 20.

The coefficient registers R ($R_0$, $R_1$, . . . , $R_{M-1}$) are a register or memory element, and each store a set of the coefficient values C(0), C(1), . . . , C(N−1) for a respective one of the filters F ($F_0$, $F_1$, . . . , $F_{M-1}$). The coefficient registers R ($R_0$, $R_1$, . . . , $R_{M-1}$) can be formed as a single register or as separate registers. Also, the coefficient registers R ($R_0$, $R_1$, . . . , $R_{M-1}$) can be formed as part of the processing units 14 of the filters F ($F_0$, $F_1$, . . . , $F_{M-1}$), respectively. The coefficient values C(0), C(1), . . . , C(N−1)

for the filters F ($F_0, F_1, \ldots, F_{M-1}$) are preset to adjust the filter characteristics of the filters F ($F_0, F_1, \ldots, F_{M-1}$). Of course, the coefficient values C(0), C(1), ..., C(N-1) for the filters F ($F_0, F_1, \ldots, F_{M-1}$) can be adaptively changed to obtain the desired filter characteristics.

As illustrated in FIG. 1, the filters F ($F_0, F_1, \ldots, F_{M-1}$) are configured to receive the M independent input data streams $U_0, U_1, \ldots, U_{M-1}$ having input data $u_0(n)$, $u_1(n), \ldots, u_{M-1}(n)$ at sample period n, respectively, and output the M output data streams $Y_0, Y_1, \ldots, Y_{M-1}$ having output data $y_0(n), y_1(n), \ldots, Y_{M-1}(n)$ at sample period n, respectively. Specifically, in the illustrated embodiment, the input data stream $U_0$ is directly inputted to the data input 18 of the first filter $F_0$. The input data streams $U_1, \ldots, U_{M-1}$ are inputted to the data inputs 18 of the filters $F_1, \ldots, F_{M-1}$ via the multiplexers Mux_$A_1, \ldots,$ Mux_$A_{M-1}$, respectively.

In the illustrated embodiment, the multiplexers Mux_A (Mux_$A_1, \ldots,$ Mux_$A_{M-1}$) are formed as a "switch", "multiple input, single output switch," "switching element", "mux", "signal selector", or "data selector." In the illustrated embodiment, each of the multiplexers Mux_A (Mux_$A_1, \ldots,$ Mux_$A_{M-1}$) has first and second inputs. The first inputs of the multiplexers Mux_$A_1, \ldots,$ Mux_$A_{M-1}$ receive the input data streams $U_1, \ldots, U_{M-1}$, respectively. The second inputs of the multiplexers Mux_$A_1, \ldots,$ Mux_$A_{M-1}$ are connected to the delayed data outputs $T_{N-1}$ of the last delays $D_{N-1}$ of the filters $F_0, F_1, F_{M-2}$, respectively, to receive the delayed output data via the delayed data outputs $T_{N-1}$, respectively.

Furthermore, the multiplexers Mux_A (Mux_$A_1, \ldots,$ Mux_$A_{M-1}$) each have a mode selection input MS for receiving a mode selection signal having a value of either "0" or "1." The multiplexers Mux_A (Mux_$A_1, \ldots,$ Mux_$A_{M-1}$) each selectively couple either the first input or the second input to the data input 18 of a respective one of the filters $F_1, \ldots, F_{M-1}$ according to the value of the mode selection signal. In the illustrated embodiment, according to the value of the mode selection signal, the filters F ($F_0, F_1, \ldots, F_{M-1}$) can function as M independent N-tap FIR filters or as a single MN-tap FIR filter. This mode selection signal can be inputted through an interface of the data stream processing device 10, for example, to change operation mode of the data stream processing device 10 between the first and second modes. Of course, this mode selection signal can be inputted according to an operation status of the data stream processing device 10.

Figure 3:
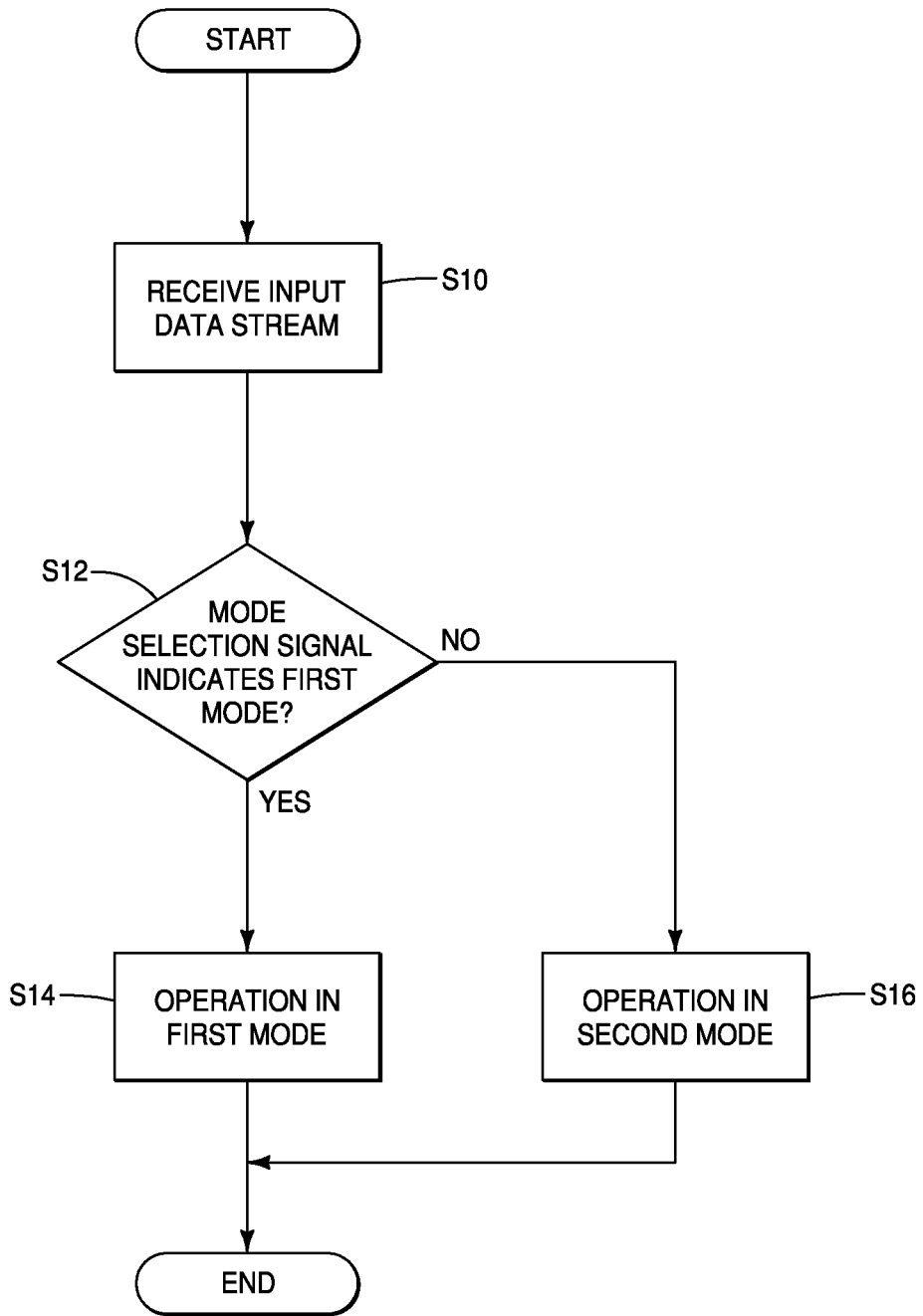
FIG. 3 illustrates a flow chart of a data stream processing method of the data stream processing device illustrated in FIG. 1.

FIG. 3 illustrates a flow chart of the data stream processing algorithm (e.g., data stream processing method) of the data stream processing device 10. The data stream processing device 10 receives the input data stream U (step S10). In response, the digital delay lines 12 output delayed output data (e.g., data values) received via the data inputs 18, respectively. The control circuitry 11 determines whether the mode selection signal indicates the first mode (step S12). If the value of the mode selection signal is "0," which indicates the first mode (Yes in step S12), then the data stream processing device 10 is operated in the first mode (step S14). On the other hand, if the value of the mode selection signal is "1," which does not indicate the first mode (No in step S12), then the data stream processing device 10 is operated in the second mode (step S16).

In particular, if the value of the mode selection signal is "0," which indicates the first mode (Yes in step S12), then the multiplexers Mux_$A_1, \ldots,$ Mux_$A_{M-1}$ couple the first inputs to the data inputs 18 of the filters F1, ..., $F_{M-1}$, respectively, such that the input data streams $U_1, \ldots, U_{M-1}$ are inputted to the filters $F_1, \ldots, F_{M-1}$ via the data inputs 18 of the filters $F_1, \ldots, F_{M-1}$, respectively. This allows the filters $F_0, F_1, \ldots, F_{M-1}$ to independently perform filtering operations on the independent input data streams $U_0, U_1, \ldots, U_{M-1}$. Thus, in this case, the control circuitry 11 (the multiplexers Mux_A (Mux_$A_1, \ldots,$ Mux_$A_{M-1}$)) simultaneously provides data values of the independent input data streams $U_0, U_1, \ldots, U_{M-1}$ to the data inputs 18 of the filters $F_0, F_1, \ldots, F_{M-1}$, respectively, such that the filters $F_0, F_1, \ldots, F_{M-1}$ independently performs filtering operations on the independent input data streams $U_0, U_1, \ldots, U_{M-1}$, respectively, and independently output the output data streams $Y_0, Y_1, \ldots, Y_{M-1}$ from the data outputs 20 of the filters $F_0, F_1, \ldots, F_{M-1}$, respectively. Therefore, in this case, the filters F ($F_0, F_1, \ldots, F_{M-1}$) form an array of M FIR filters arranged in parallel to each other, as can be found in a device supporting parallel processing of M independent data streams. In other words, the corresponding pairs of the digital delay lines 12 and the processing units 14 form a plurality of FIR filters for the input data streams $U_0, U_1, \ldots, U_{M-1}$, respectively, in response to the mode selection signal indicating the first mode.

On the other hand, if the value of the mode selection signal is "1," which indicates the second mode (or does not indicate the first mode) (No in step S12), then the multiplexers Mux_$A_1, \ldots,$ Mux_$A_{M-1}$ couple the second inputs to the data inputs 18 of the filters F1, ..., $F_{M-1}$, respectively, such that the delayed output data from the last delays $D_{N-1}$ of the filters $F_0, F_1, \ldots, F_{M-2}$ are inputted to the first delays $D_0$ of the filters $F_1, \ldots, F_{M-1}$ via the data inputs 18 of the filters $F_1, \ldots, F_{M-1}$, respectively. Thus, the digital delay lines 12 of the M filters F ($F_0, F_1, \ldots, F_{M-1}$) are serially connected to each other and are daisy-chained into a tapped delay line with MN taps in length, which multiplies the length of the FIR filter and improves its frequency selective performance, for example. Specifically, in this case, the control circuitry 11 (the multiplexers Mux_A (Mux_$A_1, \ldots,$ Mux_$A_{M-1}$)) simultaneously provides a plurality of (M) successive groups of N data values of the input data stream $U_0$ to the data inputs 18 of the filters F ($F_0, F_1, \ldots, F_{M-1}$). In particular, a first group of data values of the input data $u_0(n), u_0(n-1), \ldots, u_0(n-N+1)$ of the input data stream $U_0$ is provided to the filter $F_0$, a second group of data values of the input data $u_0(n-N), u_0(n-N-1), \ldots, u_0(n-2N+1)$ of the input data stream $U_0$ is provided to the filter $F_1, \ldots,$ an M-th group of data values of the input data $u_0(n-(M-1)N), u_0(n-(M-1)N-1), \ldots, u_0(n-MN+1)$ of the input data stream $U_0$ is provided to the filter $F_{M-1}$, The filters $F_0, F_1, \ldots, F_{M-1}$ perform filtering operations on the successive groups of data values of the input data stream $U_0$, and output the output data streams $Y_0, Y_1, \ldots, Y_{M-1}$ from the data outputs 20 of the filters $F_0, F_1, \ldots, F_{M-1}$, respectively. Furthermore, in this case, the summation circuit P calculates the sum (sum(M)) of the data values of the output data streams $Y_0, Y_1, \ldots, Y_{M-1}$ to generate an output data stream $Y_s$ having output data $y_s(n)$ at sample period n, which is an output of the combined FIR filter with MN taps at sample period n. Therefore, in this case, the filters F ($F_0, F_1, \ldots, F_{M-1}$) form a single FIR filter. In other words, the digital delay lines 12 and the processing units 14 form a single FIR filter for the input data stream $U_0$ in response to the mode selection signal not indicating the first mode. In particular, the control circuitry 11 serially couples the digital delay lines 12 with respect to each other in response to the mode selection signal not indicating the first mode.

With the data stream processing device 10, the filter configuration of the parallel FIR filters F ($F_0, F_1, \ldots, F_{M-1}$) can be reconfigurable. Thus, the signal processing (filtering) resources of the data stream processing device 10 can be efficiently utilized. In particular, efficient implementation to combine the M independent FIR filters F ($F_0, F_1, \ldots, F_{M-1}$) with N taps into a single FIR filter with MN taps can be provided.

Thus, even if some of the signal processing (filtering) resources of the data stream processing device 10 (e.g., some of the filters F ($F_0, F_1, \ldots, F_{M-1}$)) cannot be utilized for processing many parallel data streams due to certain operating conditions, such as bandwidth allocation or network configuration, the unused signal processing (filtering) resources can be efficiently reallocated to process a data stream by effectively multiplying the number of taps of the signal processing (filtering) resources in use, which enhances filtering performance with minimal increases in implementation complexity, area, and power.

In the illustrated embodiment, the filters F ($F_0, F_1, \ldots, F_{M-1}$) are configured to be identical to each other. Specifically, the filters F ($F_0, F_1, \ldots, F_{M-1}$) have the same number of taps (i.e., N taps). However, the filters F ($F_0, F_1, \ldots, F_{M-1}$) can have different numbers of taps (i.e., different number of delays) with respect to each other as needed and/or desired.

In the illustrated embodiment, the filters F ($F_0, F_1, \ldots, F_{M-1}$) form a single FIR filter in response to all of the multiplexers Mux_A (Mux_$A_1, \ldots,$ Mux_$A_{M-1}$) receiving the same mode selection signal with the same value "1". However, the multiplexers Mux_A (Mux_$A_1, \ldots,$ Mux_$A_{M-1}$) can be configured to independently receive different mode selection signals with different values "0" and "1" to form a plurality of groups of the filters F ($F_0, F_1, \ldots, F_{M-1}$) each forming a single FIR filter. For example, if all of the multiplexers Mux_A (Mux_$A_1, \ldots,$ Mux_$A_{M-1}$) receive the same mode selection signal with the same value "1" except for a k-th multiplexer Mux_$A_k$, and the k-th multiplexer Mux_$A_k$ receives the mode selection signal with the value "0," then a first group of the filters $F_0, \ldots, F_{k-1}$ can form a first single FIR filter for the input data stream $U_0$ and a second group of the filters $F_k, \ldots, F_{M-1}$ can form a second single FIR filter for the input data stream $U_k$. In this case, the summation circuit P calculates the sum of the data values of the output data streams $Y_0, \ldots, Y_{k-1}$ to generate a first output data stream $Y_{s1}$ as an output of the first single FIR filter with kN taps, and calculates the sum of the data values of the output data streams $Y_k, \ldots, Y_{M-1}$ to generate a second output data stream $Y_{s2}$ as an output of the second single FIR filter with (M-k)N taps. In this case, the filters F ($F_0, F_1, \ldots, F_{M-1}$) are grouped into two groups, but can also be grouped into more than two groups.

Figure 4A:
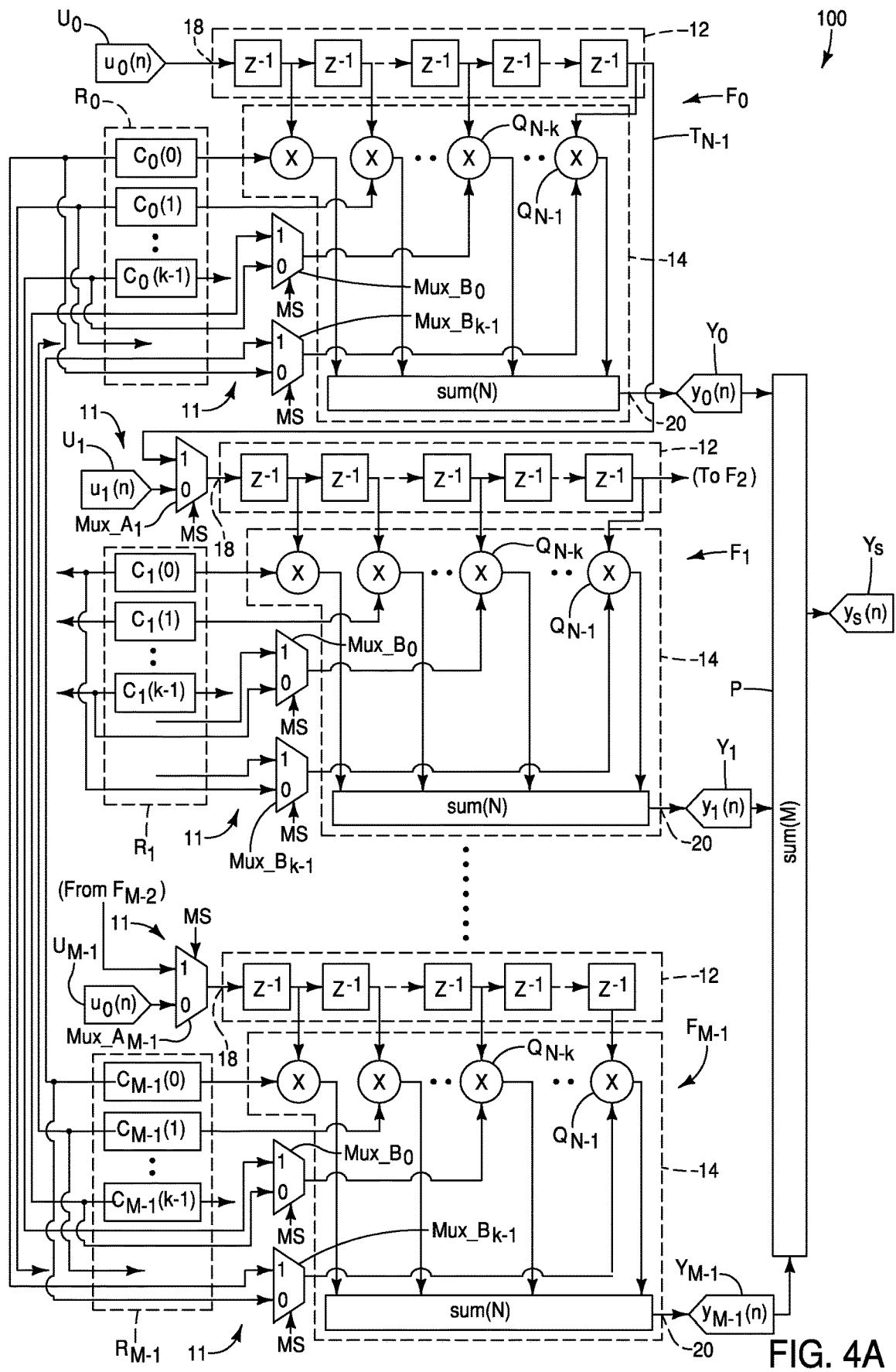
FIG. 4A illustrates a block diagram of a data stream processing device with an array of M filters according to a modification example of the first embodiment.
Figure 4B:
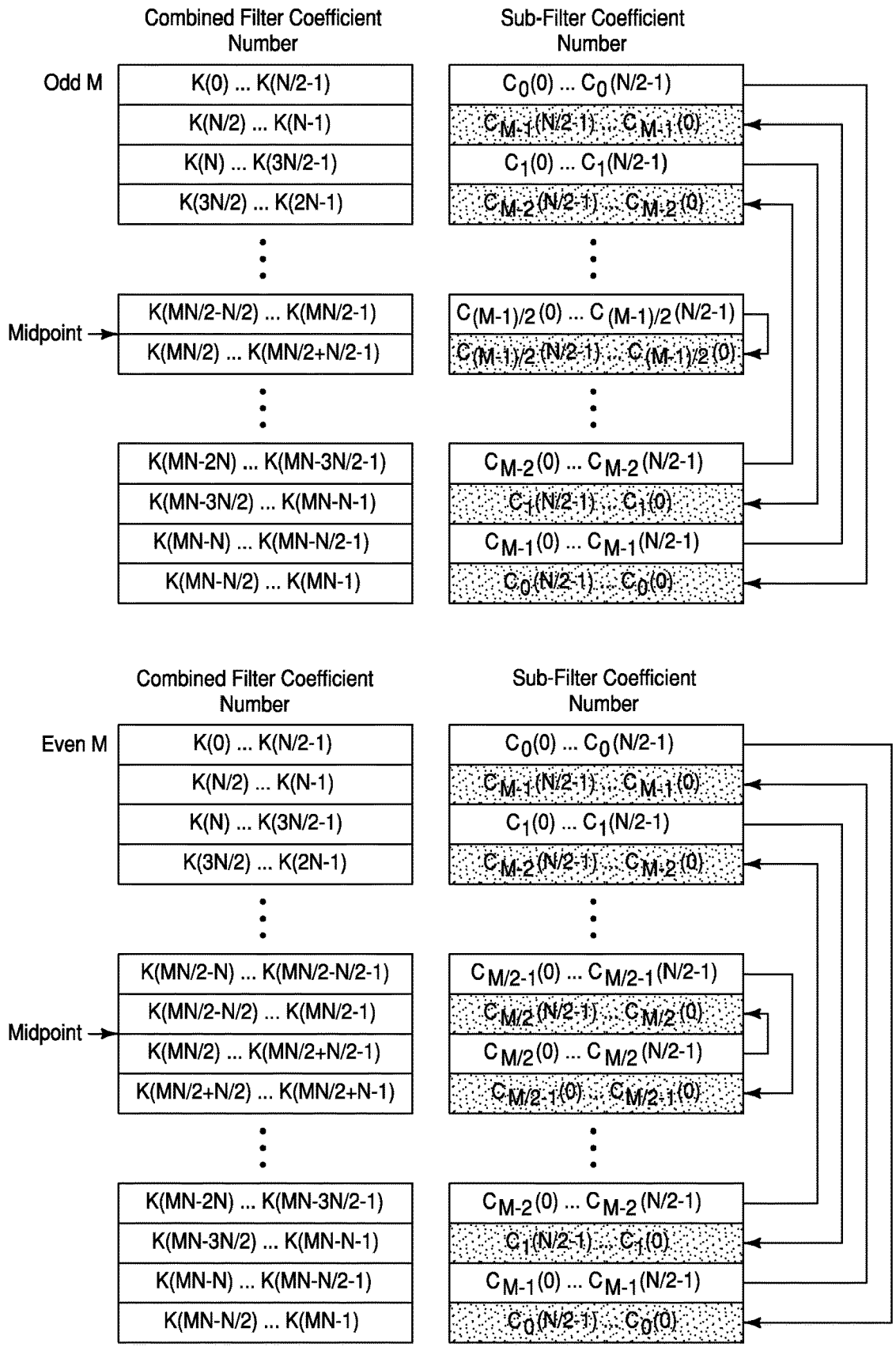
FIG. 4B illustrates filter coefficient settings of the array of the M filters illustrated in FIG. 4A while the M filters are combined with each other.

Referring now to FIGS. 4A and 4B, a data stream processing device 100 according to a modification example of the first embodiment will be described. In view of the similarity between the data stream processing devices 10 and 100, the parts of the data stream processing device 100 that are identical or similar to the parts of the data stream processing device 10 will be given the same reference numerals as the parts of the data stream processing device 10. Moreover, the descriptions of the parts of the data stream processing device 100 that are identical or similar to the parts of the data stream processing device 10 may be omitted for the sake of brevity.

As illustrated in FIG. 2, with the data stream processing device 10, the coefficient registers R ($R_0, R_1, \ldots, R_{M-1}$) each independently store one or more (N) coefficient values C(0), C(1), . . . , C(N-1), and the coefficient values C(0), C(1), . . . , C(N-1) each are routed to a respective one of the multiplier circuits $Q_0, Q_1, \ldots, Q_{N-1}$.

On the other hand, as illustrated in FIG. 4A, the data stream processing device 100 is configured such that coefficient values in each of the coefficient registers R ($R_0, R_1, \ldots, R_{M-1}$) are symmetrically routed to the multiplier circuits of a respective one of the filters F ($F_0, F_1, \ldots, F_{M-1}$) while the value of the mode selection signal is "0," which indicates the first mode. Specifically, a coefficient value is routed to two multiplier circuits in the same filter. This reduces the number or storage space of the coefficient registers R ($R_0, R_1, \ldots, R_{M-1}$) for storing the coefficient values. In this case (first mode), the filters F ($F_0, F_1, \ldots, F_{M-1}$) independently function as M independent symmetric FIR filters with symmetric filter coefficients having symmetry of an even or odd function.

Also, as illustrated in FIG. 4A, the data stream processing device 100 is configured such that coefficient values in the coefficient registers R ($R_0, R_1, \ldots, R_{M-1}$) are symmetrically routed to the multiplier circuits of a combined filter of the filters F ($F_0, F_1, \ldots, F_{M-1}$) while the value of the mode selection signal is "1," which indicates the second mode. Specifically, a coefficient value is routed to two multiplier circuits in two different filters. This also reduces the number or storage space of the coefficient registers R ($R_0, R_1, \ldots, R_{M-1}$) for storing the coefficient values. In this case (second mode), the combination of the filters F ($F_0, F_1, \ldots, F_{M-1}$) functions as a single symmetric FIR filter with symmetric filter coefficients having symmetry of an even or odd function. Thus, in the illustrated embodiment, the filters F ($F_0, F_1, \ldots, F_{M-1}$) can function as M independent symmetric FIR filters or a single symmetric FIR filter. An example of such symmetric FIR filter or filters is a root raised cosine (RRC) filter. The RRC filter has the symmetry f(x)=f(-x) in its impulse response, which makes its impulse response an even function. Also, such symmetric FIR filter or filters can have another type of symmetry, such as f(x)=-f(-x). This type of symmetry can be implemented using a single set of filter coefficients, provided that the filter coefficients are negated on one side.

More specifically, as illustrated in FIG. 4A, the data stream processing device 100 is basically identical to the data stream processing device 10, except that the data stream processing device 100 further includes at least one (k) multiplexer Mux_B for each of the filters F ($F_0, F_1,$ In particular, the data stream processing device 100 includes the k multiplexers Mux_B (Mux_$B_0, \ldots,$ Mux_$B_{k-1}$) for each of the N-tap filters F ($F_0, F_1, \ldots, F_{M-1}$), where N=2k or 2k+1. Thus, for each of the filters F ($F_0, F_1, \ldots, F_{M-1}$), the multiplexers Mux_$B_0, \ldots,$ Mux_$B_{k-1}$ are coupled to k multiplier circuits $Q_{N-k}, \ldots, Q_{N-1}$, respectively.

As also illustrated in FIG. 4A, each of the multiplexers Mux_B (Mux_$B_0, \ldots,$ Mux_$B_{k-1}$) has first and second inputs. The first inputs of the multiplexers Mux_$B_0, \ldots,$ Mux_$B_{k-1}$ for each of the filters F ($F_0, F_1, \ldots, F_{M-1}$) receive the coefficient values C(k-1), . . . , C(0), respectively, from a respective one of the coefficient registers R ($R_0, R_1, \ldots, R_{M-1}$). Thus, when the filters F ($F_0, F_1, \ldots, F_{M-1}$) function as parallel filters in response to the value of the mode selection signal being "0," which indicates the first mode, each of the filters F ($F_0, F_1, \ldots, F_{M-1}$) has symmetric filter coefficients. This is equivalent to the case in which each of the filters F ($F_0, F_1, \ldots, F_{M-1}$) as illustrated in FIG. 2 has the following filter coefficient values: C(0)=C(N-1), C(1)=C(N-2), . . . , C(k-1)=C(k) (where N=2k) (or C(k-1)=C(k+1) (where N=2k+1)). In other words, in this case (first mode), for the N-tap filter, only k coefficient values C(0), C(1), . . . , C(k-1) (where N=2k) (or k+1 coefficient values C(0), C(1), . . . , C(k) (where N=2k+1)) need to be stored in each of the coefficient registers R ($R_0, R_1, \ldots, R_{M-1}$), and the k coefficient values C(0), C(1), . . . , C(k-1)

are symmetrically applied to the N data values outputted by the delayed data outputs $T_0, T_1, \ldots, T_{N-1}$ of the tapped delay lines 12 relative to the centers of the tapped delay lines 12, respectively (i.e., relative to a position between the delayed data outputs $T_{k-1}$ and $T_k$ (where N=2k) or a position of the delayed data output $T_k$ (where N=2k+1) for each of the filters F ($F_0, F_1, \ldots, F_{M-1}$) along each of the tapped delay lines 12).

On the other hand, the second inputs of the multiplexers Mux_B$_0$, . . . Mux_B$_{k-1}$ for each of the filters F ($F_0, F_1, \ldots, F_{M-1}$) receive the coefficient values C(k−1), . . . , C(0) from a coefficient register R ($R_0, R_1, \ldots, R_{M-1}$) for a symmetrically corresponding one of the filters F ($F_{M-1}, F_{M-2} \ldots, F0$). Thus, when the filters F ($F_0, F_1, \ldots, F_{M-1}$) are combined into a single filter in response to the value of the mode selection signal being "1," which indicates the second mode, the single filter formed by the filters F ($F_0, F_1, \ldots, F_{M-1}$) has symmetric filter coefficients. In other words, in this case (second mode), for the MN-tap combined filter, only M sets of k coefficient values C(0), C(1), . . . , C(k−1) (where N=2k) (or M sets of k+1 coefficient values C(0), C(1), C(k) (where N=2k+1)) need to be stored in total in the coefficient registers R ($R_0, R_1, \ldots, R_{M-1}$), and the M sets of k coefficient values C(0), C(1), . . . , C(k−1) are symmetrically applied to the MN data values outputted by the delayed data outputs $T_0, T_1, \ldots, T_{N-1}$ of the tapped delay lines 12 relative to the center of the series of the tapped delay lines 12 (i.e., relative to a position between the delayed data outputs $T_{N-1}$ of the filter and the delayed data outputs $T_0$ of the filter $F_j$ (where M=2j), a position between the delayed data outputs $T_{k-1}$ and $T_k$ of the filter $F_j$ (where M=2j+1 and N=2k) or a position of the delayed data output $T_k$ of the filter $F_j$ (where M=2j+1 and N=2k+1) along a series of the tapped delay lines 12). Thus, symmetric arrangement (symmetric arrangement having symmetry of an even function) of the filter coefficients are preserved when the parallel filters F ($F_0, F_1, \ldots, F_{M-1}$) are combined into a single filter.

More specifically, referring to FIG. 4B, examples of the symmetric filter coefficient settings when the parallel filters F ($F_0, F_1, \ldots, F_{M-1}$) are combined into a single filter will be described in detail. In the illustrated embodiment, for simplicity of the explanation, it is assumed that each of the M parallel filters F ($F_0, F_1, \ldots, F_{M-1}$) has an even number of taps (i.e., N is even). However, the configurations discussed herein can be logically extended to a case in which each of the M parallel filters F ($F_0, F_1, \ldots, F_{M-1}$) has an odd number of taps (i.e., N is odd).

In particular, FIG. 4B illustrates an example of the symmetric filter coefficient setting when M is odd, and an example of the symmetric filter coefficient setting when M is even. In this case, the multiplexors Mux_B (Mux_B$_0$, . . . , Mux_B$_{k-1}$) (FIG. 4A) apply symmetric filter coefficient having symmetry of an even function to each of the M parallel filters F ($F_0, F_1, \ldots, F_{M-1}$) when the value of the mode selection signal is "0," which indicates the first mode. When the value of the mode selection signal is switched to "1," different symmetric coefficient values having symmetry of an even function are applied to the MN-tap combined filter.

Basically, for a MN-tap combined filter, MN combined filter coefficients K(0), K(1), . . . , K(MN−1) ("combined filter coefficient number" in FIG. 4B) are applied to the MN taps. However, in the illustrated embodiment, only MN/2 unique coefficient values (i.e., M sets of N/2 coefficient values) $C_0(0)$, . . . , $C_0(N/2−1)$, $C_1(0)$, . . . , $C_1(N/2−1)$, . . . , $C_{M-1}(0)$, . . . , $C_{M-1}(N/2−1)$ ("sub-filter coefficient number" shown in unshaded boxes in FIG. 4B) are needed for the MN combined filter coefficients K(0), K(1), . . . , K(MN−1) of the combined filter when the symmetric filter coefficient setting having symmetry of an even function is applied to the combined filter. In particular, only the MN/2 unique coefficient values $C_0(0)$, . . . , $C_0(N/2−1)$, $C_1(0)$, . . . , $C_1(N/2−1)$, . . . , $C_{M-1}(0)$, . . . , $C_{M-1}(N/2−1)$ are held or stored in the hardware registers (e.g., the coefficient registers R ($R_0, R_1, \ldots, R_{M-1}$)), and these MN/2 unique coefficient values $C_0(0)$, . . . , $C_0(N/2−1)$, $C_1(0)$, . . . , $C_1(N/2−1)$, . . . , $C_{M-1}(0)$, . . . , $C_{M-1}(N/2−1)$ are symmetrically applied to form the MN combined filter coefficients K(0), K(1), . . . , K(MN−1) having symmetry of an even function as indicated by the arrows relative to the midpoint (center). In particular, the coefficient values in shaded boxes in FIG. 4B are obtained by wire connections to the hardware registers storing the corresponding coefficient values $C_0(0)$, . . . , $C_0(N/2−1)$, $C_1(0)$, . . . , $C_1(N/2−1)$, . . . , $C_{M-1}(0)$, . . . , $C_{M-1}(N/2−1)$.

Furthermore, in the illustrated embodiment, the symmetric filter coefficient settings having symmetry of an even function are applied to the M independent parallel filters F ($F_0, F_1, \ldots, F_{M-1}$) with N taps, respectively, which also needs only need MN/2 unique coefficient values in total. For example, a set of N/2 unique coefficient values $C_0(0)$, . . . , $C_0(N/2−1)$ is symmetrically applied as the N filter coefficients K(0), . . . , K(N−1) having symmetry of an even function for the N-tap filter $F_0$. Similarly, other sets of N/2 unique coefficient values $C_1(0)$, . . . , $C_1(N/2−1)$, . . . , $C_{M-1}(0)$, . . . , $C_{M-1}(N/2−1)$ are also symmetrically applied as other sets of N filter coefficients K(N), . . . , K(2N−1), . . . , K(MN−N), . . . , K(MN−1) having symmetry of an even function for the N-tap filters respectively. Thus, this filter coefficient settings does not require additional storage space in the coefficient registers R ($R_0, R_1, \ldots, R_{M-1}$) whether the filters F ($F_0, F_1, \ldots, F_{M-1}$) are working independently or combined.

With the data stream processing device 100, efficient implementation to combine the M independent FIR filters with N taps F ($F_0, F_1, \ldots, F_{M-1}$) each having a set of symmetric filter coefficients into a single FIR filter with MN taps having a set of symmetric filter coefficients can be provided.

The signal processing (filtering) resources of two or more FIR filters can be basically combined into a single, higher tap-length FIR filter by daisy-chaining them, where the output of one filter feeds the input of the next filter. However, in case of root raised cosine (RRC) filters, the convolution of two RRC filter impulse responses results in a raised cosine (RC) impulse response. Thus, when the system requires match-filtering, as is often the case in communication systems, an RC filter cannot be used in place of an RRC filter. It is possible to split an RRC filter into two RRC filters of shorter length using numerical method. However, this adds unnecessary complexity to the system design. On the other hand, with the data stream processing device 100, this can be avoided by preserving symmetric arrangement (symmetric arrangement having symmetry of an even function or mirror symmetry) of the filter coefficients even when the parallel filters F ($F_0, F_1, \ldots, F_{M-1}$) are combined into a single filter.

Second Embodiment

Figure 5:
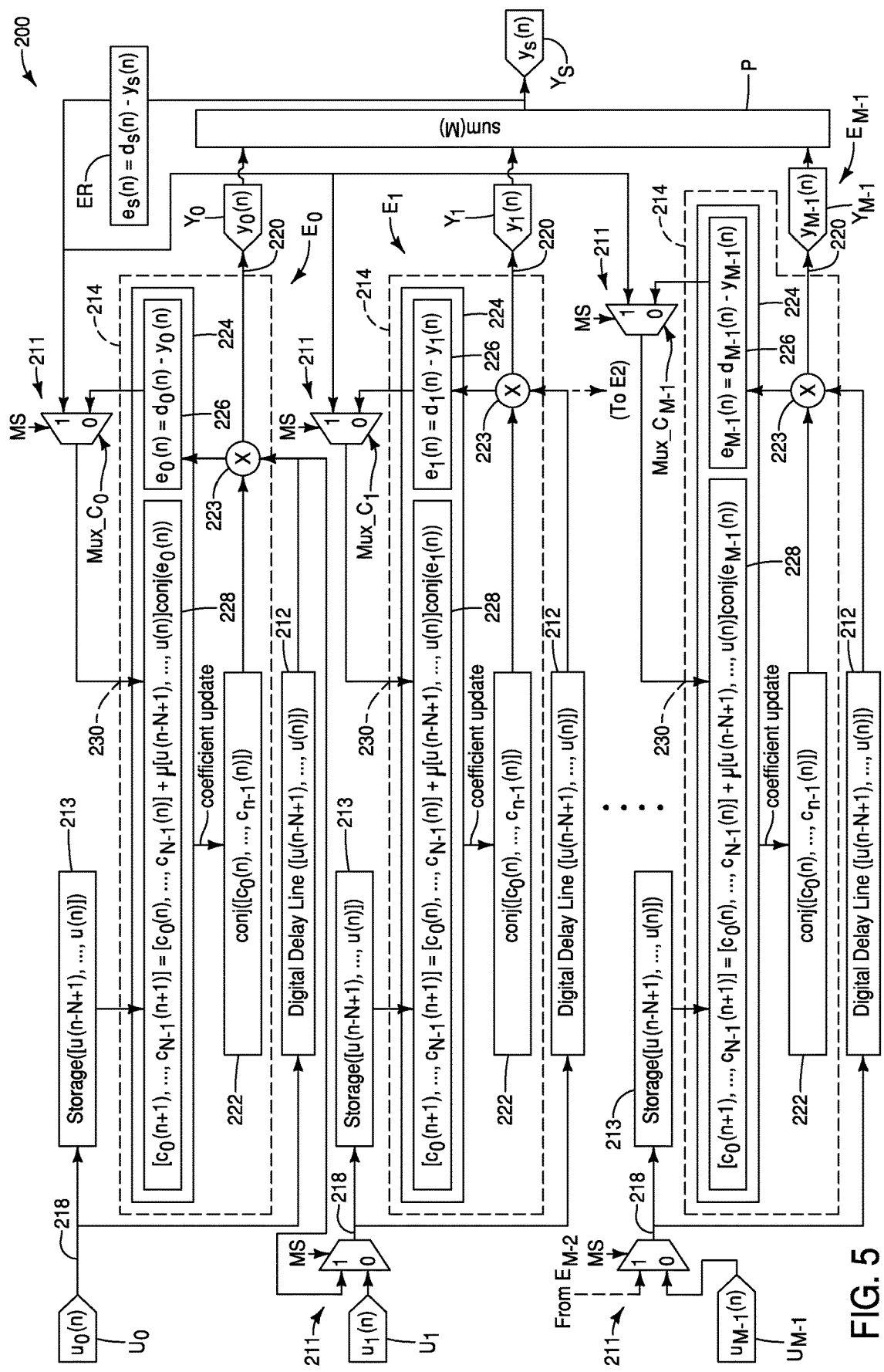
FIG. 5 illustrates a block diagram of a data stream processing device with an array of M linear channel equalizers each having an LMS linear channel equalizer according to a second embodiment.
Figure 6:
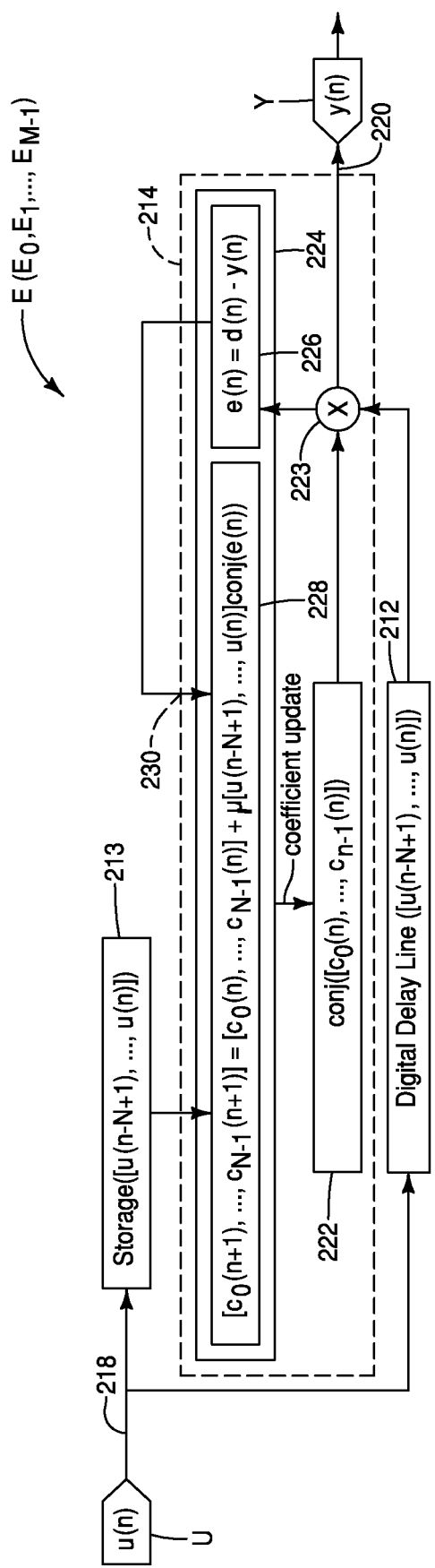
FIG. 6 illustrates an example of the LMS linear channel equalizer illustrated in FIG. 5.

Referring now to FIGS. 5 and 6, a data stream processing device 200 according to a second embodiment will be described. In view of the similarity between the data stream processing devices 10 and 200, the parts of the data stream processing device 200 that are functionally identical or similar to the parts of the data stream processing device 10 will be given the same reference numerals as the parts of the data stream processing device 10 but with "200" added thereto. Moreover, the descriptions of the parts of the data stream processing device 200 that are identical or similar to the parts of the data stream processing device 10 may be omitted for the sake of brevity.

As shown in FIG. 5, the data stream processing device 200 includes a plurality of (M: M is two or more) linear channel equalizers E ($E_0$, $E_1$, ..., $E_{M-1}$). Specifically, in the illustrated embodiment, the equalizers E ($E_0$, $E_1$, ..., $E_{M-1}$) each have an N-tap digital filter (N is one or more), such as a finite impulse response (FIR) filter, for example. The data stream processing device 200 also includes control circuitry 211 that has one or more (M−1) multiplexers Mux_A (Mux_$A_1$, ..., Mux_$A_{M-1}$). The multiplexers Mux_A (Mux_$A_1$, ..., Mux_$A_{M-1}$) are coupled between adjacent pairs of the equalizers E ($E_0$, $E_1$, ..., $E_{M-1}$), respectively. Furthermore, the control circuitry 211 also has a plurality of (M) multiplexers Mux_C (Mux_$C_0$, ..., Mux_$C_{M-1}$) for the equalizers E ($E_0$, $E_1$, ..., $E_{M-1}$), respectively. In the illustrated embodiment, by operating the multiplexers Mux_A (Mux_$A_1$, ..., Mux_$A_{M-1}$) and the multiplexers Mux_C (Mux_$C_0$, ..., Mux_$C_{M-1}$), the operation mode of the data stream processing device 200 is switched between a "first mode" in which the equalizers $E_0$, $E_1$, ..., $E_{M-1}$ independently perform equalizing operations on independent input data streams $U_0$, $U_1$, ..., $U_{M-1}$ and a "second mode" in which the equalizers $E_0$, $E_1$, ..., $E_{M-1}$ perform an equalizing operation on the input data stream $U_0$ as a single equalizer. In particular, the multiplexer Mux_A switches the input data streams U ($U_0$, $U_1$, ..., $U_{M-1}$) inputted to a data input 218 of the equalizers E ($E_0$, $E_1$, ..., $E_{M-1}$), respectively.

Specifically, as illustrated in FIG. 6, the equalizers E ($E_0$, $E_1$, ..., $E_{M-1}$) are formed as a linear channel equalizer with least mean squares (LMS) coefficient adaptation. Specifically, as illustrated in FIG. 6, the equalizers E ($E_0$, $E_1$, ..., $E_{M-1}$) each have a digital delay line or tapped delay line 212 (e.g., a data providing unit or circuit), a data storage or data storage facility 213 (e.g., a data storage or memory) and a processing unit or circuit 214. For simplicity of the explanation, FIG. 6 illustrates a simplified configuration of the equalizers E ($E_0$, $E_1$, ..., $E_{M-1}$) without showing the multiplexers Mux_A and Mux_C. In particular, FIG. 6 illustrates a simplified configuration of the equalizers E ($E_0$, $E_1$, ..., $E_{M-1}$) while the operation mode of the data stream processing device 200 is set to the "first mode." In this case, as illustrated in FIG. 6, the equalizers E ($E_0$, $E_1$, ..., $E_{M-1}$) each receive an input data stream U ($U_0$, $U_1$, ..., $U_{M-1}$) having input data or sample u(n) ($u_0(n)$, $u_1(n)$, ..., $u_{M-1}(n)$) at sample period (time) n via the data input 218, and generate an output data stream Y ($Y_0$, $Y_1$, ..., $Y_{M-1}$) having output data or sample y(n) ($y_0(n)$, $y_1(n)$, ..., $y_{M-1}(n)$) at sample period n from a data output 220. In the illustrated embodiment, the equalizers E can be formed by a single processor or multiple processors. Specifically, the digital delay line 212 and the processing unit 214 can be formed by a single processor or multiple processors.

More specifically, in the illustrated embodiment, the digital delay line 212 is basically identical to the digital delay line 12 as illustrated in FIG. 2. In particular, the digital delay line 212 includes one or more (N: N is one or more) successive delays that are connected in series with respect to each other. The successive delays are coupled to transfer input data received via the data input 218 through the successive delays in response to a shift signal or clock. With this configuration, the digital delay line 212 holds a set of the input data stream inputted via the data input 218. In the illustrated embodiment, the digital delay line 212 holds a set of N input data u(n−N+1), ..., u(n) in the past to form a N-tap digital filter. In particular, in the illustrated embodiment, the digital delay line 212 is a fixed delay whose length is the length of the filter. As illustrated in FIG. 6, the digital delay line 212 outputs the delayed output data (e.g., data values received via the data input 218) to the processing unit 214.

Furthermore, as illustrated in FIG. 5, the delayed output data of the digital delay lines 212 are each inputted to an input of a respective one of the multiplexers Mux_A (Mux_$A_1$, ..., Mux_$A_{M-1}$). With this configuration, the digital delay lines 212 of the equalizers E ($E_0$, $E_1$, ..., $E_{M-1}$) are daisy-chained while the operation mode of the data stream processing device 200 is set to the "second mode," which will be described in detail later. In particular, the digital delay lines 212 of the equalizers E ($E_0$, $E_1$, ..., $E_{M-1}$) are daisy-chained such that as soon as the delayed output data exit one of the digital delay lines 212, it goes into the next one of the digital delay lines 212.

As also illustrated in FIG. 6, the data storage 213 stores a history of the input data stream inputted via the data input 218. For example, the data storage 213 stores a history of N input data u(n−N+1), ..., u(n) in the past for calculating or updating N filter coefficients of the N-tap digital filter. In the illustrated embodiment, the data storage 213 includes a register or memory element, such as a shift register. Specifically, the data storage 213 has enough space for storing the complete set of the input data u(n−N+1), ..., u(n), and additional space needed for calculating or updating the filter coefficient, such as space needed while the error is computed in an error calculation circuit 226 of the adaptation sub-section 224 (described later). Of course, the data storage 213 can be formed by one or more (N) successive delays having the same configuration as the digital delay line 12 (FIG. 2).

The processing unit 214 includes an FIR filter sub-section 222, a dot product calculator 223, and an adaptation sub-section 224. The FIR filter sub-section 222 calculate the complex conjugate of the filter coefficients [$c_0(n)$, ..., $c_{N-1}(n)$] that have been calculated or updated by the adaptation sub-section 224. The dot product calculator 223 calculates the dot product between the complex conjugate of the filter coefficients [$c_0(n)$, ..., $c_{N-1}(n)$] (i.e., conj ([$c_0(n)$, ..., $c_{N-1}(n)$])) outputted from the FIR filter sub-section 222 and a vector of the delayed output data [u(n−N+1), u(n)] outputted from the digital delay line 212, and then outputs the dot product as the output data y(n) ($y_0(n)$, $y_1(n)$, ..., $y_{M-1}(n)$) of the output data stream Y ($Y_0$, $Y_1$, ..., $Y_{M-1}$). The operations to calculate the output data y(n) ($y_0(n)$, $y_1(n)$, ..., $y_{M-1}(n)$) by the FIR filter sub-section 222 and the dot product calculator 223 are mathematically identical to the operations to calculate the output data y(n) ($y_0(n)$, $y_1(n)$, ..., $y_{M-1}(n)$) by the processing unit 14 (FIG. 2). Thus, the FIR filter sub-section 222 and the dot product calculator 223 can be replaced by the processing unit 14 such that the processing unit 14 calculates an inner product between the vector of the input data [u(n−N+1), u(n)] outputted from the digital delay line 212 and the filter coefficients [$c_0(n)$, ..., $c_{N-1}(n)$] that have been updated by the adaptation sub-section 224 at sample period n to output the output data stream Y ($Y_0$, $Y_1$, ..., $Y_{M-1}$). Specifically, in this case, the output data y(n) can be calculated as follows: y(n)=[u(n−N+1), u(n)][$c_0(n)$, ..., $c_{N-1}(n)$]$^H$, where [ ]$^H$ denotes Hermitian transpose.

The adaptation sub-section 224 includes the error calculation circuit 226 and a coefficient update circuit 228. The error calculation circuit 226 computes the difference between known training sample d(n) and the output data y(n) to find an error e(n) at sample period n (e(n)=d(n)−y(n)). Furthermore, the coefficient update circuit 228 calculates an updated set of filter coefficients [$c_0(n+1)$, ..., $c_{N-1}(n+1)$] for sample period n+1 based on a coefficient update formula using the LMS algorithm. Specifically, the updated set of filter coefficients [$c_0(n+1)$, ..., $c_{N-1}(n+1)$] for sample period n+1 is computed as follows: [$c_0(n+1)$, ..., $c_{N-1}(n+1)$]=[$c_0(n)$, ..., $c_{N-1}(n)$]+µ[u(n−N+1), ..., u(n)] conj(e(n)), based on a vector of the stored input data [u(n−N+1), ..., u(n)] stored in the data storage 213, the current output data y(n), the complex conjugate of the error e(n), the current set of the filter coefficient at sampler period n [$c_0(n)$, ... $c_{N-1}(n)$], and an appropriate adaptation step size µ. The calculations of the error calculation circuit 226 and the coefficient update circuit 228 can be performed using the same clock as the clock applied to the digital delay line 212 or using multiple clocks different from the clock applied to the digital delay line 212. In the illustrated embodiment, the data storage 213 is configured as forming a flexible pipeline delay, and can hold the input data [u(n−N+1), ..., u(n)] while the calculations of the error calculation circuit 226 and the coefficient update circuit 228 using the different clocks take time to finish.

As illustrated in FIG. 5, the data stream processing device 200 further includes a summation circuit (e.g., summation unit) P and an error calculation circuit ER. The summation circuit P calculates the sum (sum(M)) of the data values of the output data streams $Y_0$, $Y_1$, ..., $Y_{M-1}$ to generate an output data stream $Y_s$ having output data $y_s(n)$ at sample period n. The error calculation circuit ER computes the difference between known training sample $d_s(n)$ and the output data $y_s(n)$ to find an error $e_s(n)$ at sample period n ($e_s(n)=d_s(n)−y_s(n)$).

In the illustrated embodiment, the multiplexers Mux_A (Mux_$A_1$, ..., Mux_$A_{M-1}$) and the multiplexers Mux_C (Mux_$C_0$, ..., Mux_$C_{M-1}$) are formed as a "switch", "multiple input, single output switch," "switching element", "mux", "signal selector", or "data selector." In the illustrated embodiment, each of the multiplexers Mux_A (Mux_$A_1$, ..., Mux_$A_{M-1}$) and the multiplexers Mux_C (Mux_$C_0$, ..., Mux_$C_{M-1}$) has first and second inputs. The first inputs of the multiplexers Mux_$A_1$, ..., Mux_$A_{M-1}$ receive the input data streams $U_1$, ..., $U_{M-1}$, respectively. The second inputs of the multiplexers Mux_$A_1$, ..., Mux_$A_{M-1}$ are connected to the digital delay lines 212 of the equalizers $E_0$, $E_1$, ..., $E_{M-2}$, respectively, to receive the past input data inputted via the input data stream $U_0$. On the other hand, the first inputs of the multiplexers Mux_$C_0$, ..., Mux_$C_{M-1}$ receive the errors $e_0(n)$, ..., $e_{M-1}(n)$ from the error calculation circuits 226 of the equalizers $E_0$, $E_1$, ..., $E_{M-2}$, respectively. The second inputs of the multiplexers Mux_$C_0$, ..., Mux_$C_{M-1}$ receive the error $e_s(n)$ from the error calculation circuit ER.

In particular, the multiplexers Mux_A (Mux_$A_1$, ..., Mux_$A_{M-1}$) and Mux_C (Mux_$C_0$, ..., Mux_$C_{M-1}$) each have a mode selection input MS for receiving a mode selection signal. The multiplexers Mux_A (Mux_$A_1$, ..., Mux_$A_{M-1}$) each selectively couple either the first input or the second input to the data input 218 of a respective one of the equalizers E ($E_1$, ..., $E_{M-1}$) in response to the mode selection signal. Furthermore, the multiplexers Mux_C (Mux_$C_0$, ..., Mux_$C_{M-1}$) each selectively couple either the first input or the second input to an error input 230 of the coefficient update circuit 228 of a respective one of the equalizers E ($E_1$, ..., $E_{M-1}$) in response to the mode selection signal.

The data stream processing algorithm (e.g., data stream processing method) of the data stream processing device 200 will be described by reference to FIG. 3. The data stream processing device 200 receives the input data stream U (step S10). In response, the digital delay lines 212 of the equalizers E output input data (e.g., data values) received via the data inputs 218, respectively. The control circuitry 211 determines whether the mode selection signal indicates the first mode (step S12). If the value of the mode selection signal is "0," which indicates the first mode (Yes in step S12), then the data stream processing device 200 is operated in the first mode (step S14). On the other hand, if the value of the mode selection signal is "1," which does not indicate the first mode (No in step S12), then the data stream processing device 200 is operated in the second mode (step S16).

In particular, if the value of the mode selection signal is "0," which indicates the first mode, then the multiplexers Mux_$A_1$, ..., Mux_$A_{M-1}$ couple the first inputs to the data inputs 218 of the equalizers $E_1$, ..., $E_{M-1}$, respectively, such that the input data streams $U_1$, ..., $U_{M-1}$ are inputted to the equalizers $E_1$, ..., $E_{M-1}$ via the data inputs 218 of the equalizers $E_1$, ..., $E_{M-1}$, respectively. Furthermore, in this case, the multiplexers Mux_$C_0$, ..., Mux_$C_{M-1}$ couple the first inputs to the coefficient update circuits 228 of the equalizers $E_1$, ..., $E_{M-1}$, respectively, such that the errors $e_0(n)$, ..., $e_{M-1}(n)$ from the error calculation circuits 226 are inputted to the coefficient update circuits 228, respectively.

This allows the equalizers $E_0$, $E_1$, ..., $E_{M-1}$ to independently perform equalizing operations on the independent input data streams $U_0$, $U_1$, ..., $U_{M-1}$, respectively. In this case, as illustrated in FIG. 5, the digital delay lines 212 of the equalizers E ($E_0$, $E_1$, ..., $E_{M-1}$) output the input data u(n−N+1), u(n) of the input data streams U ($U_0$, $U_1$, ..., $U_{M-1}$), respectively. More specifically, the digital delay line 212 of the equalizer $E_0$ outputs a set of N input data $u_0(n−N+1)$, ..., $u_0(n)$ of the input data stream $U_0$, the digital delay line 212 of the equalizer $E_1$ outputs a set of N input data $u_1(n−N+1)$, ..., $u_1(n)$ of the input data stream $U_1$, ..., and the digital delay line 212 of the equalizer $E_{M-1}$ outputs a set of N input data $u_{M-1}(n−N+1)$, ..., $u_{M-1}(n)$ of the input data stream $U_{M-1}$. Furthermore, the data storages 213 of the equalizers $E_0$, $E_1$, ..., $E_{M-1}$ store the input data of the input data streams $U_0$, $U_1$, ..., $U_{M-1}$, respectively. More specifically, the data storage 213 of the equalizer $E_0$ stores a history of N input data $u_0(n−N+1)$, ..., $u_0(n)$ of the input data stream $U_0$, the data storage 213 of the equalizer $E_1$ stores a history of N input data $u_1(n−N+1)$, ..., $u_1(n)$ of the input data stream $U_1$, ..., and the data storage 213 of the equalizer $E_{M-1}$ stores a history of N input data $u_{M-1}(n−N+1)$, ..., $u_{M-1}(n)$ of the input data stream $U_{M-1}$. Furthermore, the processing units 214, the error calculation circuits 226 and the coefficient update circuits 228 of the equalizers $E_0$, $E_1$, ..., $E_{M-1}$ perform processing (calculations) illustrated in FIG. 5, respectively, to output the output data streams $Y_0$, $Y_1$, ..., $Y_{M-1}$, respectively. Thus, in this case, the control circuitry 211 (the multiplexers Mux_A (Mux_$A_1$, ..., Mux_$A_{M-1}$)) simultaneously provides data values of the independent input data streams $U_0$, $U_1$, ..., $U_{M-1}$ to the data inputs 218 of the equalizers $E_0$, $E_1$, ..., $E_{M-1}$, respectively, such that the equalizers $E_0$, $E_1$, ..., $E_{M-1}$ independently perform equalizing operations on the independent input data streams $U_0$, $U_1$, ..., $U_{M-1}$, respectively, and independently output the output data streams $Y_0$, $Y_1$, ..., $Y_{M-1}$ from the data outputs 220 of the equalizers $E_0$, $E_1$, ..., $E_{M-1}$, respectively. Therefore, in this case, the equalizers E ($E_0$, $E_1$, ..., $E_{M-1}$) form an array of M equalizers arranged in parallel to each other.

In other words, the corresponding pairs of the digital delay lines 212 and the processing units 214 form a plurality of equalizers for the input data streams $U_0$, $U_1$, ..., $U_{M-1}$, respectively, in response to the mode selection signal indicating the first mode. Furthermore, in the illustrated embodiment, the processing units 214 update the coefficient values for generating the output data streams $Y_0$, $Y_1$, ..., $Y_{M-1}$ based on the errors (e.g., error values) received via the error inputs 230, respectively. The control circuitry 211 provides the errors e(n) (e.g., error values) between the output data y(n) of the processing units 214 and the training samples or reference signals d(n) to the error inputs 230 of the processing units 214, respectively, in response to the mode selection signal indicating the first mode. Furthermore, in the illustrated embodiment, the processing units 214 generate the output data streams $Y_0$, $Y_1$, ..., $Y_{M-1}$ by applying the coefficient values to the data values of the independent input data streams $U_0$, $U_1$, ..., $U_{M-1}$, respectively, in response to the mode selection signal indicating the first mode.

On the other hand, if the value of the mode selection signal is "1," which indicates the second mode (or does not indicate the first mode), then the multiplexers Mux_$A_1$, ..., Mux_$A_{M-1}$ couple the second inputs to the data inputs 218 of the equalizers $E_1$, ..., $E_{M-1}$, respectively, such that the digital delay lines 212 of the equalizers $E_0$, $E_1$, ..., $E_{M-1}$ are cascaded to each other. Thus, the digital delay lines 212 of the equalizers $E_0$, $E_1$, ..., $E_{M-1}$ are serially connected to each other to output a set of MN input data $u_0(n-MN+1)$, ..., $u_0(n)$ inputted via the input data stream $U_0$. In particular, the digital delay line 212 of the equalizer $E_0$ outputs a set of N input data $u_0(n-N+1)$, ..., $u_0(n)$ of the input data stream $U_0$, the digital delay line 212 of the equalizer $E_1$ output a set of N input data $u_0(n-2N+1)$, ..., $u_0(n-N)$ of the input data stream $U_0$, ..., and the digital delay line 212 of the equalizer $E_{M-1}$ outputs a set of N input data $u_0(n-MN+1)$, ..., $u_0(n-(M-1)N)$ of the input data stream $U_0$. Similarly, the data storage 213 of the equalizer $E_0$ stores a history of N input data $u_0(n-N+1)$, ..., $u_0(n)$ of the input data stream $U_0$, the data storage 213 of the equalizer $E_1$ stores a history of N input data $u_0(n-2N+1)$, ..., $u_0(n-N)$ of the input data stream $U_0$, ..., and the data storage 213 of the equalizer $E_{M-1}$ stores a history of N input data $u_0(n-MN+1)$, ..., $u_0(n-(M-1)N)$ of the input data stream $U_0$. Furthermore, in this case, the multiplexers Mux_$C_0$, ..., Mux_$C_{M-1}$ couple the second inputs to the coefficient update circuits 228 of the equalizers $E_0$, $E_1$, ..., $E_{M-1}$, respectively, such that the coefficient update circuits 228 receive the error $e_s(n)$ from the error calculation circuit ER.

In this case, in each of the equalizers E ($E_0$, $E_1$, ..., $E_{M-1}$), the coefficient update circuit 228 independently calculates an updated set of filter coefficients $[c_0(n+1), ..., c_{N-1}(n+1)]$ based on the coefficient update formula using the LMS algorithm. Specifically, the updated set of filter coefficients $[c_0(n+1), ..., c_{N-1}(n+1)]$ is computed based on a vector of the stored input data stored in the data storage 213, the current output data y(n), the complex conjugate of the error $e_s(n)$, the current set of the filter coefficient at sampler period n $[c_0(n), ... c_{N-1}(n)]$, and an appropriate adaptation step size μ. Also, in each of the equalizers E ($E_0$, $E_1$, ..., $E_{M-1}$), the processing unit 214 independently calculates the current output data y(n) based on the same formula illustrated in FIG. 5, but using the updated set of filter coefficients updated by the coefficient update circuit 228 and the input data outputted from the digital delay line 212. Thus, in this case, the control circuitry 11 (the multiplexers Mux_A (Mux_$A_1$, ..., Mux_$A_{M-1}$)) simultaneously provides a plurality of (M) successive groups of data values of the input data stream $U_0$ to the data inputs 218 of the equalizers $E_0$, $E_1$, ..., $E_{M-1}$. With this configuration, the equalizers $E_0$, $E_1$, ..., $E_{M-1}$ perform equalizing operations on the successive groups of data values of the input data stream $U_0$, which is equivalent to performing equalizing operation on the input data stream $U_0$ with a combined equalizer of the equalizers $E_0$, $E_1$, ..., $E_{M-1}$. Furthermore, the equalizers $E_0$, $E_1$, ..., $E_{M-1}$ output the output data streams $Y_0$, $Y_1$, ..., $Y_{M-1}$ from the data outputs 220 of the equalizers $E_0$, $E_1$, ..., $E_{M-1}$, respectively. Moreover, in this case, the summation circuit P calculates the sum (sum(M)) of the data values of the output data streams $Y_0$, $Y_1$, ..., $Y_{M-1}$ to generate an output data stream $Y_s$ having output data $y_s(n)$ at sample period n, which is an output of the combined equalizer with MN taps at sample period n. Therefore, in this case, the equalizers E ($E_0$, $E_1$, ..., $E_{M-1}$) form a single equalizer.

In other words, the digital delay lines 212 and the processing units 214 form a single equalizer for the input data stream $U_0$ in response to the mode selection signal not indicating the first mode. Furthermore, the control circuitry 211 provides the error $e_s(n)$ (e.g., error value) between the sum of the data values (e.g., output data) of the output data streams $Y_0$, $Y_1$, ..., $Y_{M-1}$ of the processing units 214 and the training sample or reference signal $d_s(n)$ to the error inputs 230 of the processing units 214, respectively, in response to the mode selection signal not indicating the first mode. Furthermore, in the illustrated embodiment, the processing units 214 generate the output data streams $Y_0$, $Y_1$, ..., $Y_{M-1}$ by applying the coefficient values to the successive groups of the data values of the input data stream $U_0$, respectively, in response to the mode selection signal not indicating the first mode.

In the illustrated embodiment, the M equalizers E ($E_0$, $E_1$, ..., $E_{M-1}$) with N taps are combined into a single equalizer of MN taps in a manner similar to the first embodiment, in which an array of M FIR filters of N taps are combined into a single FIR filter of MN taps. To combine the M equalizers E ($E_0$, $E_1$, ..., $E_{M-1}$), the output data from the equalizers E ($E_0$, $E_1$, ..., $E_{M-1}$) are summed in a manner similar to the first embodiment, in which the M FIR filters are combined. In the illustrated embodiment, to combine the adaptation sub-sections 224 of the M individual equalizers E ($E_0$, $E_1$, ..., $E_{M-1}$), a common error $e_s(n)$ is produced from the difference between the training sample $d_s(n)$ and the output data $y_s(n)$ of the combined equalizer. This common error $e_s(n)$ is then used to update all coefficient sets of all M equalizers E ($E_0$, $E_1$, ..., $E_{M-1}$), which maintain their own independent storages for the input data or samples u(n) and the set of the filter coefficients $[c_0(n), ..., c_{N-1}(n)]$. In the illustrated embodiment, the switch between the first mode in which the M equalizers E ($E_0$, $E_1$, ..., $E_{M-1}$) operate independently and the second mode in which the M equalizers E ($E_0$, $E_1$, ..., $E_{M-1}$) are combined into a single equalizer is effected by setting the value of the mode selection signal to "1" inputted to the multiplexors Mux_A and Mux_C.

With the data stream processing device 200, the equalizer configuration of the linear channel equalizers E ($E_0$, $E_1$, ..., $E_{M-1}$) can be reconfigurable. Thus, the signal processing (equalizing) resources of the data stream processing device 200 can be efficiently utilized. In particular, an efficient implementation to combine the LMS linear channel equalizers E ($E_0$, $E_1$, ..., $E_{M-1}$) having N-tap filter length into a single LMS linear channel equalizer with MN-tap length filter can be provided.

Thus, even if some of the signal processing (equalizing) resources of the data stream processing device 200 (e.g., some of the equalizers E ($E_0$, $E_1$, . . . , $E_{M-1}$)) cannot be utilized for processing many parallel data streams due to certain operating conditions, such as bandwidth allocation or network configuration, the unused signal processing (equalizing) resources can be efficiently reallocated to process a data stream by effectively multiplying the number of taps of the signal processing (equalizing) resources in use, which enhances equalizing performance with minimal increases in implementation complexity, area, and power. In particular, the liner channel equalizers generally not only have a filtering section, but also a coefficient update unit. Reallocating of the signal processing (equalizing) resources of unused parallel equalizers to a single equalizer multiplies both the tap length of the filtering section and the number of the coefficient update units. Thus, the performance can be improved without slowing down the rate of the coefficient update even when the number of the filter coefficients has multiplied.

Generally, when a plurality of liner channel equalizers are provided in a device, each equalizer computes an error between the output and the training sample or reference to update filter coefficients. If two equalizers are daisy-chained together, then each adaptive filter section needs to compute its own error, which is computationally inefficient. On the other hand, with the data stream processing device 200, two or more filtering sections can be combined into a single filtering section with a single coefficient set.

In the illustrated embodiment, the data stream processing device 200 only additionally needs a summation (sum(M)) by the summation circuit P, a difference computation for the error $e_s(n)$ by the error calculation circuit ER, and a switching by the multiplexors Mux C to combine the M equalizers E ($E_0$, $E_1$, . . . , $E_{M-1}$) of N taps into a more powerful equalizer of MN taps. Thus, with the data stream processing device 200, the data storages and the digital delay lines for input data and all of the coefficient update facilities can be efficiently reused.

In the illustrated embodiment, the equalizers E ($E_0$, $E_1$, . . . , $E_{M-1}$) form a single equalizer in response to all of the multiplexers Mux_A (Mux_$A_1$, . . . , Mux_$A_{M-1}$) receiving the same mode selection signal with the same value "1". However, the multiplexers Mux_A (Mux_$A_1$, . . . , Mux_$A_{M-1}$) can be configured to independently receive different mode selection signals with different values "0" and "1" to form a plurality of groups of the equalizers E ($E_0$, $E_1$, . . . , $E_{M-1}$) each forming a single equalizer. For example, if all of the multiplexers Mux_A (Mux_$A_1$, . . . , Mux_$A_{M-1}$) receive the same mode selection signal with the same value "1" except for a k-th multiplexer Mux_$A_k$, and the k-th multiplexer Mux_$A_k$ receives the mode selection signal with the value "0," then a first group of the equalizers $E_0$, . . . , $E_{k-1}$ can form a first single equalizer for the input data stream $U_0$ and a second group of the equalizers $E_k$, . . . , $E_{M-1}$ can form a second single equalizer for the input data stream $U_k$. In this case, the summation circuit P calculates the sum of the data values of the output data streams $Y_0$, . . . , $Y_{k-1}$ to generate a first output data stream $Y_{s1}$ as an output of the first single equalizer with kN taps, and calculates the sum of the data values of the output data streams $Y_k$, . . . , $Y_{M-1}$ to generate a second output data stream $Y_{s2}$ as an output of the second single equalizer with (M−k)N taps. In this case, the equalizers E ($E_0$, $E_1$, . . . , $E_{M-1}$) are grouped into two groups, but can also be grouped into more than two groups.

The foregoing data stream processing devices 10, 100 and 200 can be included in a demodulator of a communication signal receiver. For example, the demodulator can be configured to receive communication signal, and perform analog-to-digital conversion of the communication signal to produce the input data streams U ($U_0$, $U_1$, . . . , $U_{M-1}$). Also, the foregoing data stream processing devices 10, 100 and 200 can be included in a modular of a communication signal transmitter. Likewise, the foregoing data stream processing devices 10, 100 and 200 can be included in a digital filter, such as, but not limited to, in a device for audio or radar signal processing.

The foregoing data stream processing devices 10, 100 and 200 can be implemented in an application specific integrated circuit (ASIC). The foregoing data stream processing devices 10, 100 and 200 can be implemented and/or included in a field programmable gate array (FPGA) device or other such programmable hardware logic device. A bitstream can include data therein which, when received by an FPGA device or other such programmable hardware logic device, causes the receiving device to implement and/or include one or more of the foregoing data stream processing devices 10, 100 and 200. A machine-readable medium can include such a bitstream recorded therein.

A machine-readable medium can include a netlist or other such hardware specification recorded thereon that when processed by suitable software and/or hardware to instantiate an ASIC device or configure an FPGA device or other such programmable hardware logic device, the device implements and/or includes one or more of the foregoing data stream processing devices 10, 100 and 200. A machine-readable medium can include a device specification in a hardware description language such as, but not limited to, VHDL or Verilog, recorded thereon that when processed by suitable software and/or hardware to instantiate an ASIC device or configure an FPGA device or other such programmable hardware logic device, the device implements and/or includes one or more of the foregoing data stream processing devices 10, 100 and 200. A computer-implemented method can automatically generate the foregoing netlist or other such hardware specification or device specification in a hardware description language. For example, the computer-implemented method can perform an algorithm to automatically determine appropriate couplings among elements of one or more of the foregoing data stream processing devices. Instructions can be recorded on a machine-readable medium which, when executed by one or more computer processors, cause the one or more computer processors to perform the computer-implemented method.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A data stream processing device comprising:
a plurality of data providing units configured to output data values received via a plurality of data inputs, respectively;
a plurality of processing units configured to generate output data based on the data values, respectively; and
control circuitry including a mode selection input and configured to
simultaneously provide data values of different data streams to the data inputs of the data providing units, respectively, in response to the mode selection input receiving a signal indicating a first mode, and
simultaneously provide a plurality of successive groups of data values of one of the data streams to the data inputs of the data providing units, respectively, in response to the mode selection input not receiving the signal indicating the first mode.

2. The data stream processing device according to claim 1, further comprising
a summation unit configured to calculate a sum of the output data generated by the processing units.

3. The data stream processing device according to claim 1, wherein
corresponding pairs of the data providing units and the processing units form a plurality of FIR filters for the data streams, respectively, in response to the mode selection input receiving the signal indicating the first mode, and
the data providing units and the processing units form a single FIR filter for the one of the data streams in response to the mode selection input not receiving the signal indicating the first mode.

4. The data stream processing device according to claim 1, wherein
the data providing units each include a tapped delay line with one or more delayed data outputs, the one or more delayed data outputs being configured to output one or more data values received via a corresponding one of the data inputs, respectively.

5. The data stream processing device according to claim 4, wherein
the processing units each include one or more delayed data inputs, the one or more delayed data inputs of each of the processing units being connected to the one or more delayed data outputs of a corresponding one of the data providing units, respectively.

6. The data stream processing device according to claim 5, further comprising
one or more registers configured to store one or more coefficient values applied to the one or more data values outputted by the one or more delayed data outputs of the tapped delay lines,
the processing units being configured to generate the output data as sums of products between the one or more data values outputted by the one or more delayed data outputs of the tapped delay lines and the one or more coefficient values, respectively.

7. The data stream processing device according to claim 4, wherein
the control circuitry is configured to serially couple the tapped delay lines of the data providing units with respect to each other in response to the mode selection input not receiving the signal indicating the first mode.

8. The data stream processing device according to claim 4, further comprising
one or more registers configured to store one or more coefficient values applied to the one or more data values outputted by the one or more delayed data outputs of the tapped delay lines,
the control circuitry being configured to
symmetrically apply the one or more coefficient values to the one or more data values outputted by the one or more delayed data outputs of the tapped delay lines relative to centers of the tapped delay lines, respectively, in response to the mode selection input receiving the signal indicating the first mode, and
symmetrically apply the one or more coefficient values to the one or more data values outputted by the one or more delayed data outputs of the tapped delay lines relative to a center of a series of the tapped delay lines in response to the mode selection input receiving the signal indicating the first mode.

9. The data stream processing device according to claim 1, further comprising
a plurality of data storages configured to
store data values of the data streams, respectively, in response to the mode selection input receiving the signal indicating the first mode, and
store successive groups of data values of the one of the data streams, respectively, in response to the mode selection input not receiving the signal indicating the first mode.

10. The data stream processing device according to claim 1, wherein
corresponding pairs of the data providing units and the processing units form a plurality of equalizers for the data streams, respectively, in response to the mode selection input receiving the signal indicating the first mode, and
the data providing units and the processing units form a single equalizer for the one of the data streams in response to the mode selection input not receiving the signal indicating the first mode.

11. The data stream processing device according to claim 1, wherein
the processing units are configured to update coefficient values for generating the output data based on error values received via error inputs, respectively,
the control circuitry is configured to
provide error values between the output data of the processing units and reference signals to the error inputs of the processing units, respectively, in response to the mode selection input receiving the signal indicating the first mode, and
provide an error value between a sum of the output data of the processing units and a reference signal to the error inputs of the processing units, respectively, in response to the mode selection input not receiving the signal indicating the first mode.

12. The data stream processing device according to claim 11, wherein
the processing units are configured to update the coefficient values using a least mean squares algorithm.

13. The data stream processing device according to claim 11, wherein
the processing units are configured to
generate the output data by applying the coefficient values to the data values of the data streams, respectively, in response to the mode selection input receiving the signal indicating the first mode, and
generate the output data by applying the coefficient values to the successive groups of the data values of the one of the data streams, respectively, in response to the mode selection input not receiving the signal indicating the first mode.

14. A data stream processing method comprising:
outputting, by a plurality of data providing units, data values received via a plurality of data inputs, respectively;
generating, by a plurality of processing units, output data based on the data values, respectively;
simultaneously providing data values of different data streams to the data inputs of the data providing units, respectively, in response to a mode selection signal indicating a first mode; and
simultaneously providing a plurality of successive groups of data values of one of the data streams to the data inputs of the data providing units, respectively, in response to the mode selection signal not indicating the first mode.

15. The data stream processing method according to claim 14, wherein
corresponding pairs of the data providing units and the processing units form a plurality of FIR filters for the data streams, respectively, in response to the mode selection signal indicating the first mode, and
the data providing units and the processing units form a single FIR filter for the one of the data streams in response to the mode selection signal not indicating the first mode.

16. The data stream processing method according to claim 14, further comprising
symmetrically applying one or more coefficient values to one or more data values outputted by one or more delayed data outputs of tapped delay lines of the data providing units relative to centers of the tapped delay lines, respectively, in response to the mode selection signal indicating the first mode, and
symmetrically applying the one or more coefficient values to the one or more data values outputted by the one or more delayed data outputs of the tapped delay lines of the data providing units relative to a center of a series of the tapped delay lines in response to the mode selection signal indicating the first mode.

17. The data stream processing method according to claim 14, wherein
corresponding pairs of the data providing units and the processing units form a plurality of equalizers for the data streams, respectively, in response to the mode selection signal indicating the first mode, and
the data providing units and the processing units form a single equalizer for the one of the data streams in response to the mode selection signal not indicating the first mode.

18. The data stream processing device according to claim 1, wherein
the different data streams are parallel data streams.

19. The data stream processing method according to claim 14, wherein
the different data streams are parallel data streams.

* * * * *